US011221616B2

(12) United States Patent
West et al.

(10) Patent No.: US 11,221,616 B2
(45) Date of Patent: Jan. 11, 2022

(54) SENSOR SERVICE PREDICTION

(71) Applicant: Schneider Electric Systems USA, Inc., Foxboro, MA (US)

(72) Inventors: Steven J. West, Hull, MA (US); Joseph Downey, Plymouth, MA (US); Zhisheng Sun, Hopkinton, MA (US); Spencer Howe, Scituate, MA (US); Michael Plaziak, Chepachet, RI (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 617 days.

(21) Appl. No.: 16/018,393

(22) Filed: Jun. 26, 2018

(65) Prior Publication Data
US 2018/0373235 A1  Dec. 27, 2018

Related U.S. Application Data

(60) Provisional application No. 62/564,524, filed on Sep. 28, 2017, provisional application No. 62/525,397, filed on Jun. 27, 2017.

(51) Int. Cl.
*G05B 23/02* (2006.01)
*G01N 27/416* (2006.01)

(52) U.S. Cl.
CPC ..... *G05B 23/0283* (2013.01); *G01N 27/4165* (2013.01); *G05B 23/0208* (2013.01); *G05B 23/0221* (2013.01); *G05B 23/0235* (2013.01)

(58) Field of Classification Search
CPC ............ G01N 27/4165; G05B 23/0208; G05B 23/0221; G05B 23/0235; G05B 23/0283; G05B 19/042; G05B 19/4183
(Continued)

(56) References Cited

U.S. PATENT DOCUMENTS 4,300,392 A * 11/1981 Bloomer .................. G01K 7/25
374/1
5,766,228 A *  6/1998 Bonnet .............. A61N 1/36542
607/16
(Continued)

FOREIGN PATENT DOCUMENTS

EP           2496999 B1    6/2014
JP         2000088676 A    3/2000

OTHER PUBLICATIONS

Merriam-Webster: Odomoter/ Definition of Odometer by Merriam-Webster Retrieved from the Internet, Jun. 1, 2017 (Jun. 1, 2017), XP055549484, URL:https://web.archive.org/web/20170601154404/ https://www.merrriam-webster.com/dictionary/odometer [retrieved Jan. 30, 2019].

(Continued)

*Primary Examiner* — John E Breene
*Assistant Examiner* — Jeffrey P Aiello
(74) *Attorney, Agent, or Firm* — Locke Lord LLP

(57) ABSTRACT

A sensor service prediction system and method are provided for a sensor. The system monitors sensor operations of the sensor, and provides a calendar age odometer which increments a calendar age of the sensor by a first time interval as the sensor operates. The system further provides an accelerated age odometer which increments an accelerated age of the sensor by a second time interval according to the increment of the calendar age and a sensor temperature or other measurable environmental condition associated therewith. The system obtains a value of a sensor property at different calendar ages or accelerated ages of the sensor over time, and predicts and outputs when the sensor property of the sensor is anticipated to reach a sensor property threshold based on the values of the sensor property in relations to the accelerated age.

20 Claims, 11 Drawing Sheets

(58) Field of Classification Search
USPC .............. 702/19, 34–35, 107, 180, 183, 188
See application file for complete search history.

(56) References Cited

U.S. PATENT DOCUMENTS

| | | | | |
|---|---|---|---|---|
| 6,151,565 | A * | 11/2000 | Lobley | G06Q 10/06 703/2 |
| 8,032,234 | B2 * | 10/2011 | Foss | G05B 23/0232 700/26 |
| 8,086,424 | B2 * | 12/2011 | Farmer | B01D 46/0086 702/184 |
| 2005/0268734 | A1 | 12/2005 | Watkins, Jr. et al. | |
| 2006/0092913 | A1 * | 5/2006 | Joseph | H04L 45/28 370/351 |
| 2007/0270982 | A1 * | 11/2007 | Foss | G05B 23/0232 700/26 |
| 2010/0063762 | A1 * | 3/2010 | Pechstein | G01N 27/4165 702/85 |
| 2011/0166826 | A1 * | 7/2011 | Jensen | A61G 7/05 702/177 |
| 2012/0150380 | A1 * | 6/2012 | Whittaker | G07C 5/006 701/29.4 |
| 2014/0105622 | A1 * | 4/2014 | True | G03G 15/0863 399/27 |
| 2014/0364701 | A1 * | 12/2014 | Masakov | A61B 5/0205 600/301 |
| 2015/0219033 | A1 | 8/2015 | Jammoussi et al. | |
| 2018/0061206 | A1 * | 3/2018 | Baur | G01K 7/36 |
| 2019/0302731 | A1 * | 10/2019 | Kettemer | G05B 23/0221 |

OTHER PUBLICATIONS

Extended European Search Report for corresponding Application No. 18179907.3-1022/3444691 dated Feb. 14, 2019.

* cited by examiner

500

| Calendar Day | Slope Status Output | Service Prediction Condition |
|---|---|---|
| 0 through 74 | OK | The algorithm is configured not to make a prediction if the Slope is greater than 90%. |
| 75 | 21 Days Remaining | The algorithm sees that Slope has degraded to 87%. Based on the previously determined Slope of 92%, the algorithm calculates that the slope is degrading at a rate of 5% per 30 "Accelerated Days" and predicts it will degrade the remaining 7% to the Threshold of 80% in 7/5x30 = 42 Accelerated Days. Using the measured temperature of 35 °C, the algorithm inverts Eq4 and calculates that 21 Calendar Days remain at that temperature. |
| 90 | 6 Days Remaining | With a Slope now of 82%, the algorithm looks back at the previous Slope of 87% that was determined 30 Accelerated Days ago, and calculates that the remaining 2% degradation to 80% will occur in 2/5x30=12 Accelerated Days, which at 35 °C equals 6 Calendar Days. |
| 90 (at 15 °C) | 24 Days Remaining | Let's imagine that on Calendar Day 90, after calibration, the process solution temperature briefly falls to 15 °C. Calculation from Eq4 of Calendar Days remaining from Accelerated Days remaining will yield a value of 24 Days. |

FIG. 5

| | HISTORY LOG ENTRIES | DESCRIPTION |
|---|---|---|
| 1 | 25 03 2017 10:30 CONNECTED TRANSMITTER<br>ID= DTM SENSOR RUNTIME=0.00 DAYS | THIS ENTRY REPRESENTS 1st CONNECTION TO THE DTM IN THE FACTORY BEFORE SHIPMENT. |
| 2 | 25 03 2017 10:43 CALIBRATED SLOPE=98.6 E0=9.3 | SLOPE (%) AND ASYMMETRY POTENTIAL (E0 IN mV) ARE ENTERED IN THE LOG. |
| 3 | 25 03 2017 10:43 RESPONSE TIME 24 SECONDS | THE RESPONSE TIME OF THE SENSOR WHEN CHANGING BUFFER SOLUTION IS ENTERED. |
| 4 | 25 04 2017 09:50 CONNECTED TRANSMITTER<br>ID= DTM SENSOR RUNTIME=0.01 DAYS | THE SENSOR IS CONNECTED TO THE DTM IN USER'S LAB FOR CHECK OUT AND CALIBRATION BEFORE INSTALLATION. |
| 5 | 25 04 2017 10:15 CALIBRATED SLOPE=98.1 E0=9.2 | SLOPE AND AYMMETRY ARE ENTERED IN THE LOG. |
| 6 | 25 04 2017 10:15 RESPONSE TIME 36 SECONDS | RESPONSE TIME IS ENTERED IN THE LOG. |
| 7 | 25 04 2017 10:45 CONNECTED TRANSMITTER<br>ID=237 SENSOR RUNTIME=0.05 DAYS | SENSOR IS CONNECTED TO THE TRANSMITTER AT THE MEASUREMENT LOCATION |
| 8 | 25 05 2017 10:00 CONNECTED TRANSMITTER<br>ID= DTM SENSOR RUNTIME=29.52 DAYS | SENSOR IS CONNECTED TO THE DTM IN USER'S LAB FOR MONTHLY RECALIBRATION. |
| 9 | 25 05 2017 10:23 CALIBRATED SLOPE=96.2 E0=7.0 | SLOPE AND AYMMETRY ARE ENTERED IN THE LOG. |
| 10 | 25 05 2017 10:23 RESPONSE TIME 36 SECONDS | RESPONSE TIME IS ENTERED IN THE LOG. |
| 11 | 25 05 2017 10:55 CONNECTED TRANSMITTER<br>ID=237 SENSOR RUNTIME=30.05 DAYS | SENSOR IS REINSTALLED AT THE MEASUREMENT LOCATION. |
| 12 | 25 06 2017 10:55 CONNECTED TRANSMITTER<br>ID= DTM SENSOR RUNTIME=61.05 DAYS | SENSOR IS CONNECTED TO THE DTM IN USER'S LAB FOR MONTHLY RECALIBRATION. |
| 13 | 25 06 2017 11:08 CALIBRATED SLOPE=93.0 E0=4.4 | SLOPE AND AYMMETRY ARE ENTERED IN THE LOG. |
| 14 | 25 06 2017 11:23 RESPONSE TIME 56 SECONDS | RESPONSE TIME IS ENTERED IN THE LOG. |
| 15 | 25 06 2017 11:40 CONNECTED TRANSMITTER<br>ID=237 SENSOR RUNTIME=61.09 DAYS | SENSOR IS REINSTALLED AT THE MEASUREMENT LOCATION. |
| 16 | 25 07 2017 09:37 CONNECTED TRANSMITTER<br>ID= DTM SENSOR RUNTIME=91.00 DAYS | SENSOR IS CONNECTED TO THE DTM IN USER'S LAB FOR MONTHLY RECALIBRATION. |
| 17 | 25 07 2017 09:50 CALIBRATED SLOPE=88.0 E0=0.7 | SLOPE AND AYMMETRY ARE ENTERED IN THE LOG. |
| 18 | 25 07 2017 09:50 RESPONSE TIME 82 SECONDS | RESPONSE TIME IS ENTERED IN THE LOG. |
| 19 | 25 07 2017 09:50 ALERT! SENSOR SERVICE REQUIRED IN 47.91 DAYS | SLOPE HAS FALLEN BELOW 90% THRESHOLD SET BY USER AND PREDICTED TO FALL TO 80% WITHIN 47.91 DAYS. |
| 20 | 25 07 2017 11:08 CALIBRATED SLOPE=96.5 E0=5.7 | USER HAS CLEANED AND RECALIBRATED THE SENSOR. NEW SLOPE AND ASYMMETRY ARE ENTERED IN THE LOG. |
| 21 | 25 07 2017 11:08 RESPONSE TIME 33 SECONDS | NEW RESPONSE TIME IS ENTERED IN THE LOG. |
| 22 | 25 07 2017 11:40 CONNECTED TRANSMITTER<br>ID=237 SENSOR RUNTIME=91.09 DAYS | SENSOR IS REINSTALLED AT THE MEASUREMENT LOCATION. |

NOTE: RUNTIME IS ACCUMULATED ONLY WHILE THE SENSOR IS CONNECTED TO THE DTM OR TRANSMITTER. SHIPMENT TIME (1 MONTH IN THIS EXAMPLE) AND TIME BETWEEN CONNECTIONS (0.5 hrs IN THIS EXAMPLE) ARE NOT ACCUMULATED.

*FIG. 7*

SENSOR SERVICE PREDICTION

The present application claims priority under 35 U.S.C. 119(e) to U.S. Patent Application Ser. No. 62/525,397, filed on Jun. 27, 2017, entitled "SENSOR SERVICE PREDICTION", and to U.S. Patent Application Ser. No. 62/564,524 filed on Sep. 28, 2017, entitled "PH SENSOR HISTORY LOG EMAIL LINK", which are herein incorporated by reference in their entirety.

FIELD

The present disclosure is related to a method and system for managing the servicing of sensors, and more particularly, to a method and system for predicting sensor service for smart sensors.

BACKGROUND

Sensors are used to detect or measure physical or other properties. Many types of sensors may need to undergo periodic maintenance or replacement over time. Among the types of sensors that are employed for environmental or process monitoring or process control (e.g., whether "in-line" in a vessel, pipe, or natural or manmade body of water or "at line" in the form of a hand-carried instrument, or on a laboratory benchtop), pH sensors are among the most maintenance-intensive. The pH sensors may require, for example, frequent recalibration and periodic cleaning or reconditioning. It is, however, difficult to determine or anticipate with accuracy when such sensors will require maintenance or replacement.

SUMMARY

To address these and other shortcomings, a sensor service prediction system and method are provided for a sensor. The system includes a memory and one or more processors for implementing the operations of the service prediction method. In one example embodiment, the processor monitors sensor operations of the sensor, and provides a calendar age odometer which increments a calendar age of the sensor by a first time interval as the sensor operates. The calendar age represents a duration of time that the sensor has operated. The processor further determines a sensor temperature or other measurable environmental condition for each increment of the calendar age, and provides an accelerated age odometer which increments an accelerated age of the sensor by a second time interval according to the increment of the calendar age and the sensor temperature or other measurable environmental condition associated therewith. The processor also obtains a value of a sensor property, which degrades with usage of the sensor over time, at different calendar ages or accelerated ages of the sensor over time, and predicts when the sensor property of the sensor is anticipated to reach a sensor property threshold based on the values of the sensor property in relations to the accelerated age. The processor can thereafter output a status of the sensor property based on the prediction. Sensor service is to be performed when the sensor property reaches or exceeds the sensor property threshold.

The processor can further store or update sensor information over time in a sensor history log on a memory in the sensor, the sensor history log including the calendar age, the accelerated age and the sensor property.

The sensor can be a pH sensor, and the sensor property can be an electrode slope reflecting a relationship between electrochemical potential and pH for the pH sensor. Each increment of the sensor accelerated age can be determined according to the following relationship:

$$A_{Acc} = A_{25} \cdot e^{k \cdot (T-25)}$$

where:
$A_{Acc}$ is an increment of the accelerated age,
$A_{25}$ is an increment of the calendar age,
e is a base of the natural logarithm,
k is an experimentally determined constant, and
T is the temperature in ° C. of the sensor for the increment of the calendar age.

Furthermore, the prediction of when the sensor property of the sensor is anticipated to reach a sensor property threshold can be implemented using a linear extrapolation of the sensor property in relations to the accelerated age. The calendar age can be incremented by the calendar age odometer by adding the first time interval to a prior accumulation of increments of the calendar age, and the accelerated age can be incremented by the accelerated age odometer by adding the second time interval to a prior accumulation of increments of the accelerated age. The status of the sensor property can be outputted to a remote management system.

In addition, the processor can further provide a graphical user interface of a device type manager for the sensor. The sensor stores a sensor history log. The graphical user interface includes an email link. The processor can access the sensor history log from the sensor. In response to selection of the email link, the processor can automatically generate an email including an address for a predefined recipient, and can attach the accessed sensor history log to the email. The processor can transmit the generated email to the predefined recipient via a communication device.

The various operations can be performed on a single system or distributed between components of different systems, such as a host computer (e.g., a transmitter or computer) and the sensor.

DESCRIPTION OF THE FIGURES

The description of the various example embodiments is explained in conjunction with the appended drawings.

FIG. 5 illustrates an example Table of data, showing a relationship between calendar age, slope status output and service prediction condition.

FIG. 7 illustrates an example sensor history log, which can be stored in a memory of the transmitter, pH sensor or other component of the sensor system of FIGS. 1 and 2.

DISCUSSION OF EXAMPLE EMBODIMENTS

A sensor system is provided which incorporates a sensor prediction feature to predict when sensor service (e.g., maintenance or replacement) should be performed. The sensor prediction feature can be applied to any sensor or similar device that may require periodic maintenance or replacement and for which the frequency of that maintenance or replacement can be correlated to environmental or other measurable conditions under which the device is being deployed. Furthermore, when the sensor system is connected to a host computer system, such as for sensor calibration, a graphical user interface (GUI) for a device type manager (DTM) for the sensor can be provided with a link to enable the automatic generation of an electronic message (e.g., email or the like) in order to send a sensor history log or other sensor information of the sensor to remote party. For the purposes of explanation, the service prediction and other features will be described below with reference to an example pH sensor(s).

Figure 1:
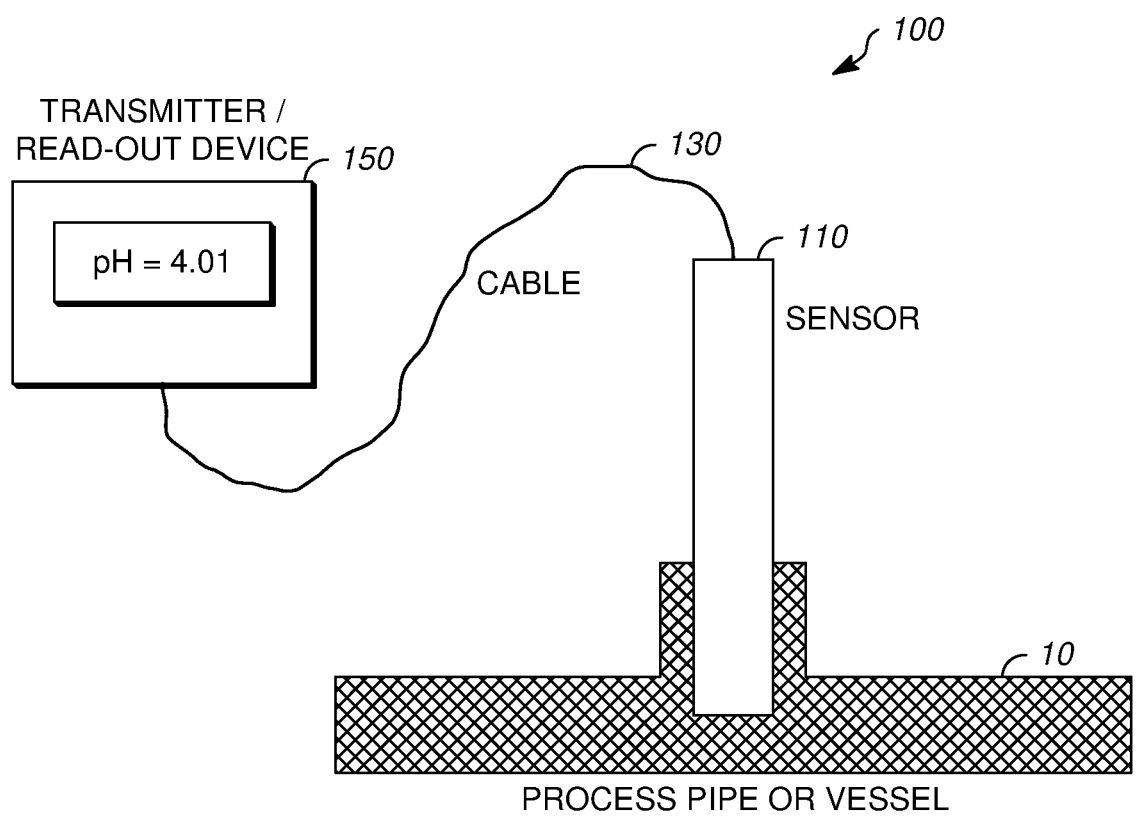
FIG. 1 illustrates a block diagram of an example sensor system, such as a pH sensor system, with a transmitter and pH sensor in accordance with an embodiment.
Figure 2:
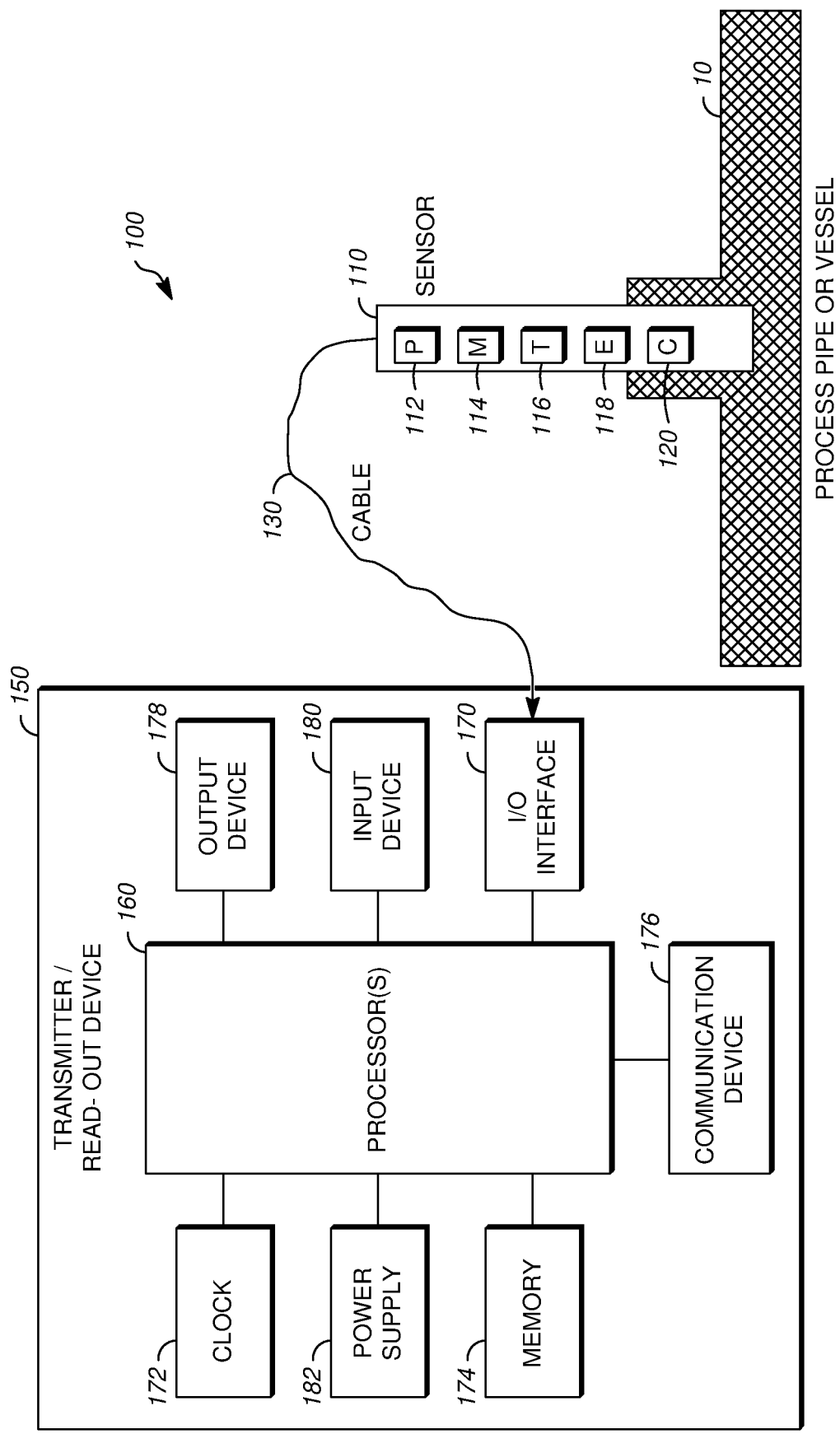
FIG. 2 illustrates a block diagram of example components of the pH sensor system of FIG. 1.

FIGS. 1 and 2 illustrate an example sensor system 100 which includes a pH sensor 110 and a transmitter or read-out device (hereinafter "transmitter") 150. The pH sensor 110 is connectable to the transmitter 150 over a cable 130, which can enable data communication between the pH sensor 110 and transmitter 150 and, if desired, the supply of power from the transmitter 150 to the pH sensor 110. The pH sensor 110 is configured to operate when the pH sensor 110 is connected to the transmitter 150 or other host computer system. In this example, the pH sensor 110 is used to measure a pH value of an aqueous solution in a process environment, e.g., a pipe 10 such as in an industrial plant or a facility. The information associated with the pH sensor 110 (e.g., pH values, etc.) can be accessed and transmitted by the transmitter 150 to a regional or central management system (e.g., a remote computer system) that is configured to manage or control operations, for example, in an industrial plant or a facility according to conditions sensed by the pH sensor 110 and other sensors.

As shown in FIG. 2, the pH sensor 110 can be a "smart sensor". For example, a pH sensor is an electrochemical cell whose internally generated potential or electromotive force is a function of the pH of the medium in which it is immersed. When immersed in a fluid in a process pipe or vessel and connected via a cable to an appropriate electronic device or instrument, a conventional or "non-smart" pH sensor's potential can be read as an analog signal and converted by means well-known to those of ordinary skill in the art into a pH value of the medium. The pH value can then be indicated locally on a display means on the device, or transmitted as an input to a control system or other information processing means. On the other hand, a smart pH sensor contains internal electronics that at the very least includes a memory, but almost invariably also contains the electronics to convert the analog signal to a digital one. Furthermore, with a smart pH sensor, information about the process environment in which the sensor is deployed can be written by the transmitter to the sensor history log in the sensor's memory. This information may go above and beyond the basic recording of process pH values, the reporting of which is an important reason for using a smart pH sensor. This information may include the maximum and minimum pH values measured. Since most industrial pH sensors contain temperature sensors, maximum and minimum temperature values may be recorded. pH sensors often have self-diagnostic features. For example, the resistance values of the glass membrane and reference junction, which are diagnostic parameters with importance well-known to those of ordinary skill in the art, can also be recorded. Further, the transmitter can keep track of the amount of time a sensor is connected and write "runtime odometer" parameters to the sensor history log, enabling a user to track aging of the sensor, as will be discussed in further detail below.

In the example of FIG. 2, the pH sensor 110 can include a processor(s) 112, a memory 114, a temperature sensor 116 to measure a temperature of the sensor (e.g., a process temperature during operation), a potential sensor 118 to measure an electrochemical potential of a solution, and a communication device/interface 120 to facilitate communication with a host computer system, such as the transmitter 150 or other computer.

The memory 114 is configured to store data including programs/applications implemented by the processor 112 to control the operations and components of the pH sensor 110. The memory 114 is configured to store data such as sensor information, including for example pH measurements, temperature and other measurements (e.g., electrochemical potential, etc.), sensor parameters (e.g., electrode potential S, asymmetry potential $E_0$, etc.), calendar and accelerated ages of the pH sensor, and other data relating to the operations of the pH sensor 110 as described herein. These and other information can be stored in a sensor history log in the memory 114. The sensor history log can include entries of such sensor information at different dates/times.

The processor 112 controls the various operations and components of the pH sensor 110. For example, the processor 112 is configured to measure an electrochemical potential of a solution and calculate or facilitate calculation of a pH measurement of a solution according to the measured electrochemical potential. The processor 112 is also configured to transmit, receive and/or store information including pH measurements, temperature and other measurements (e.g., electrochemical potential, etc.), sensor parameters (e.g., electrode slope S, asymmetry potential $E_0$, etc.), calendar and accelerated ages of the pH sensor, and other data relating to the operations of the pH sensor 110 and the sensor history log.

A smart sensor, such as the pH sensor 110, can provide various benefits and advantages over conventional sensors. For example, digital signals can be transmitted more reliably than analog signals and generally over longer cables without information loss. Furthermore, pH and other sensors are often packaged with temperature sensors, because temperature often must be known in order to interpret the pH signal. Thus, with conventional sensors, a multi-conductor cable is often needed for connection of the sensor system to the read-out device, whereas pH and temperature information can be communicated digitally with just two conductors resulting in simpler and less expensive cables. Data can be stored in a smart sensor. Model number, serial number, manufacturing date, run time, temperature history, calibration history, sensor history log and other sensor-related information are just a few examples of useful data that can be stored in the smart pH sensor 110.

As further shown in FIG. 2, the transmitter 150 includes a processor(s) 160, a I/O interface 170, a clock 172, a memory 174, a communication device 176, an output device 178, a user input device 180 and a power supply 182.

The memory 174 is configured to store data including programs/applications implemented by the processor 160 to control the operations and components of the transmitter 150. The memory 174 is configured to store data such as sensor information, including for example sensor parameters (e.g., electrode potential S and asymmetry potential $E_0$) and the sensor history log.

The processor 160 controls the various operations and components of the transmitter 150. For example, the processor 160 can be configured to obtain from the pH sensor 110 a pH measurement of a solution or a measurement of an electrochemical potential of the solution for use in calculating the pH measurement. The processor 160 is also configured to perform calibration operations for the pH sensor 110, including determining an electrode slope S and asymmetry potential $E_0$. The processor 160 is also configured to implement and update a calendar age odometer and an accelerated age odometer for the pH sensor 110, and to provide a graphical user interface (GUI), such as of a device type manager (DTM), having a link to automatically generate and send an electronic message with the sensor history log to a remote computer system (e.g., another party). The processor 160 is also configured to transmit, receive and/or store information including pH measurements, temperature and other measurements (e.g., electrochemical potential, etc.), sensor parameters (e.g., electrode slope S, asymmetry potential $E_0$, etc.), calendar and accelerated ages of the pH sensor, and sensor history log and other data relating to the operations of one or more pH sensor(s) 110.

Figure 3:
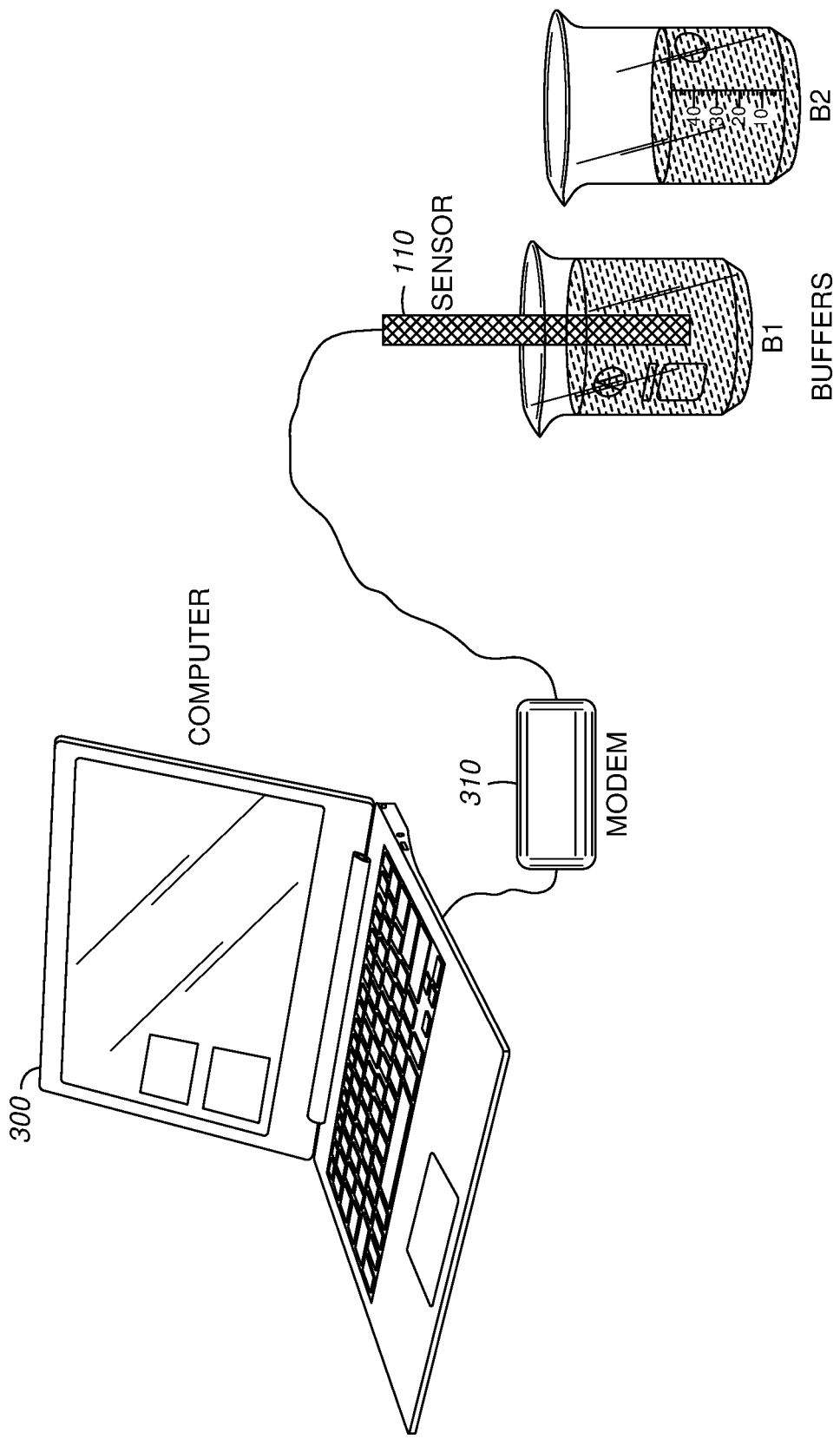
FIG. 3 illustrates a computer environment in which a computer can also be used to calibrate the pH sensor in FIGS. 1 and 2 at an offsite location in accordance with a further embodiment.

FIG. 3 illustrates a computer 300, which can also be used instead of the transmitter 150 to calibrate the pH sensor 110. The computer 300 may be communicatively connected to a network(s), and include at least a processor(s) (e.g., CPUs), memory, and network interface device(s) or NIDs, output device (e.g., display) and user input device (e.g., mouse, keyboard, etc.). The memory can store data or information, such as applications or programs or code (executable on one or more processors), configuration files, and/or other data and information to provide the various functions and operations described herein.

As shown in the example of FIG. 3, the computer 300 is connected to the pH sensor 110 across a modem 300. The processor and memory of the computer 300 can perform operations and functions similar to those of the transmitter 150 as previously described with reference to FIGS. 1 and 2. The computer 300 can be used to calibrate a smart sensor, such as the pH sensor 110, at an offsite location such as a laboratory or facility, which is a significant advantage of smart sensors. That is, the use of a smart sensor allows calibration to be performed outside of the process environment in which a pH sensor is normally deployed, for example, on a bench in a laboratory or instrument shop where the manipulation of the pH sensor in and out of standard pH buffer solutions is facilitated and where the input of data from the calibration process is facilitated through the use of a computer as user interface rather than the not-so-user-friendly interface typical of a transmitter deployed at the process measurement site. A software application resides in the computer that enables read/write communication with the sensor. Such software application is often a Device Type Manager (DTM). Here, a different type of data can be written to the sensor history log, not only the slope and asymmetry potential described above, but information such as the date and time of calibration and perhaps diagnostic information as described herein.

Example embodiments of calibration and pH measurement, service prediction and age odometers, and electronic message link will be described below in greater detail, and can be implemented in the example computer environments shown in FIGS. 1-3.

Calibration and pH Measurement

A pH sensor, such as the pH sensor 110, can be operated to measure the pH value (e.g., acidity or basicity) of an aqueous solution. However, the pH sensor may require calibration to ensure proper measurement prior to initial use (e.g., at the manufacturer) as well as over time (e.g., periodically or after prolonged usage). For example, many pH sensors are glass membrane electrodes which are calibrated by measuring the electrochemical potential of the glass electrode in at least two solutions of known pH value called buffers. This enables equations (1) and (2) below to be solved based on the Nernst Equation which is well known to those of ordinary skill in the art:

$$S = \frac{E_2 - E_1}{pH_2 - pH_1} \tag{1}$$

$$E_0 = E_1 - S \cdot pH_1 \tag{2}$$

where:
S is the electrode slope,
$E_2$ and $E_1$ are the electrochemical potentials measured in second and first buffers, respectively,
$pH_2$ and $pH_1$ are the pH values of the second and first buffers, respectively, and
$E_0$ is called the asymmetry potential.

For an ideal pristine electrode, the electrode slope equals −59.16 mV/pH at 25° C., which can reflect the slope at 100%. However, the pH sensor property of the electrode slope degrades over time with the usage of the pH sensor 110, and thus, the value of the electrode slope S and the asymmetry potential $E_0$ will need to be updated in the sensor 110 as part of the calibration operations.

Once the electrode slope S and asymmetry potential $E_0$ are determined by calibration, the pH sensor 110 can be updated with this information so that future pH measurements of unknown solutions can be calculated, for example, using equation (3) which is noted below:

$$pH = \frac{E - E_0}{S} \tag{3}$$

where:
S is the electrode slope, $E_0$ is called the asymmetry potential, and

E is the electrochemical potential measured in a solution to be tested.

For simplicity's sake, temperature has been left out of these equations. How to include temperature in these calculations and in calibration and measurement with pH electrodes is well known to those of ordinary skill in the art but is not relevant to the features described herein in the present disclosure.

The calculations described above can be carried out by a transmitter, a computer or other host computer system, where the values of the electrode slope S and asymmetry potential $E_0$ are also stored or accessible.

As previously explained, the pH sensor 110 herein is preferably a "smart sensor", instead of a conventional analog sensor. For example, since the calibration process involves immersion of a pH sensor in buffers, the pH sensor must either be removed from the process application, or the buffer must somehow be valved into the process, which requires rarely implemented engineering complexities. Thus, with conventional analog pH sensors, calibration can be a very burdensome maintenance procedure. Typically, buffer solutions must be carried to the measurement site where lab or work benches may not exist. The area may be a hazardous location or one which is dusty and where lighting may be poor. The pH sensor must be removed from the process necessitating measures to contain the process fluid in the absence of the sensor. The pH sensor must then be immersed in the buffers sequentially while the read-out device is operated to record the readings. Often, the read-out device is separated from the sensor by a length of conduit that contains the connecting cable and therefore two individuals must be present, one to manipulate the sensor and buffers while the other operates the read-out device.

A smart pH sensor, such the pH sensor 110, on the other hand can be calibrated in a lab or instrument shop. It can then be carried to the measurement site, swapped with another smart pH sensor which is due to be recalibrated, and the calibration information stored in the fresh sensor's memory, e.g., asymmetry potential $E_0$ and electrode slope S, can be read by the read-out device and process measurements can be quickly resumed. A stock of calibrated smart pH sensors also can be maintained and cycled into the process in accordance with a maintenance schedule.

As mentioned herein, various types of information, including calibration coefficients can be stored in a smart pH sensor's memory. When information such as serial number, manufacturing date, model number, etc., is combined with "event" data, such as calibration dates and times, calibration coefficients, run time, maximum and minimum readings, etc., a collection of data referred to as a historian or history log can be accumulated in the sensor's memory.

Service Prediction and Age Odometers

A sensor system, such as the pH sensor system 100, can be configured to predict when service (e.g., maintenance or replacement) may need to be performed on the sensor, such as the pH sensor 110, as the sensor is used over time. For example, an observable trend in the behavior of pH sensors is that the sensor property, in this example, the electrode slope, can degrade over time with the use of the sensor. In a newly manufactured pH sensor, the electrode slope is approximately −59.16 mV/pH at 25° C., which can represent its electrode slope state at 100 percent or 100%, which degrades to a lower percentage with use of the pH sensor over time. Some users may consider 90% to be the lowest acceptable threshold for the electrode slope, while other users may accept 80%. It has further been discovered that the degradation of the electrode slope property occurs more rapidly under more severe environmental conditions, e.g., at higher temperatures than at lower temperatures. The acceleration of degradation with increasing temperature can, for example, be described to a good approximation by the exponential equation (4), as follows:

$$A_{Acc} = A_{25} \cdot e^{k \cdot (T-25)} \quad (4)$$

where:

$A_{Acc}$ is an increment of the accelerated age, $A_{25}$ is an increment of the calendar age representing an incremental time interval over which the sensor has operated, e is a base of the natural logarithm, k is an experimentally determined constant, and T is the temperature in ° C. of the sensor for the increment of the calendar age.

Accordingly, an accelerated age odometer for a pH sensor can be provided which increments an accelerated age of the sensor according to each calendar age increment of the calendar age odometer and the sensor temperature associated therewith.

The relationship as set forth in equation (4) is consistent with basic $1^{st}$-order chemical reaction kinetics, where a rule of thumb derived from the Arrhenius Equation is that such processes double their rate for each 10-degree Celsius increase in temperature. It has been discovered that the data fits well with a k value of 0.05, reasonably close to 0.069 which would correspond to a doubling every 10° C. Thus, a more accurate prediction of an age of a sensor can be ascertained over time.

In one example, a pH sensor (e.g., 110) has a memory (e.g., 114) in which data can be stored and from which data can be read through a digital interface (e.g., communication device/interface 120). Data stored in the memory are referred to henceforth as the sensor history log. A digital electronics unit, such as the transmitter (e.g., 150) is connected to the pH sensor by means of a cable 130. The transmitter is capable of detecting when a sensor is connected, reading from and writing to the sensor history log, reading potential values from the glass electrode in the pH sensor, and determining the temperature of the pH sensor by reading a temperature sensor (e.g., 116) which can for example be embedded in the pH sensor body.

The transmitter having substantial programmable computing capability (e.g., processor 160) and memory (e.g., 174) distinct from the pH sensor, is able to record potential values measured in buffers ($E_1$ and $E_2$ in equation (1)), "knows" $pH_1$ and $pH_2$ from equation (1), and is able to compute the pH sensor slope S (also referred to as the "electrode slope") and asymmetry potential $E_0$ from the equations (1) and (2) during a calibration procedure, as previously discussed.

The transmitter includes a clock (e.g., 172) or the like. Whenever the pH sensor 110 is connected to the transmitter, an algorithm can update on a frequent basis, for example once per second, a "calendar age odometer" for the connected sensor. The value of a calendar age increment is symbolized by $A_{25}$ in the equation (4). In this example, the calendar age is simply the cumulative time the pH sensor has been connected to the transmitter and presumed to be "in use" and therefore aging. The calendar age is accumulated in the odometer by adding the elapsed time since the last update to the previously stored parameter (e.g., accumulated calendar age=prior accumulated calendar age+calendar age increment $A_{25}$). For example, the calendar age can be overwritten with an updated value which is ever increasing with each update.

The transmitter also implements an algorithm for maintaining an "accelerated age odometer". The accelerated age is accumulated in the same manner as the calendar age by determining an accelerated age increment (e.g., $A_{Acc}$ in equation (4)) and adding the accelerated age increment to the last update to the previously stored parameter (e.g., accumulated accelerated age=prior accumulated accelerated age+accelerated age increment $A_{Acc}$). The accelerated age increment (e.g., $A_{Acc}$) at each update can be calculated from the calendar age increment $A_{25}$ increment using equation (4). The transmitter updates the calendar age and accumulated age on the pH sensor. Thus, the pH sensor can maintain two odometers, e.g., the calendar age odometer and the accelerated age odometer, even when used with different host computer systems.

Inspection of equation (4) shows that an increment of elapsed accelerated age will equal an increment of elapsed calendar age if the temperature at the time of the update is 25° C. With k=0.069 (e.g., doubling every 10° C.) and a temperature of 35° C., the magnitude of the accelerated age increment $A_{Acc}$ would be double that of the calendar age increment $A_{25}$. At k=0.069 and a temperature of 15° C., the accelerated age increment $A_{Acc}$ would be one half that of the calendar age increment $A_{25}$.

On a nearly continuous basis, for example once per second, both the calendar and accelerated age odometers can be updated and the latest values stored in the digital electronics memory (e.g., 114). Each time the pH sensor 110 is calibrated, which can be weekly or monthly, the asymmetry potential $E_0$, electrode slope S, calendar age odometer value, and accelerated age odometer value are stored in the sensor history log. Thus, as time passes and the pH sensor ages, a database of electrode slope and asymmetry potential values, each associated with a calendar and accelerated age value accumulates in the sensor history log. The electrode slope and associated accelerated age are the parameters that are used to illustrate an example embodiment of the present disclosure.

Figure 4:
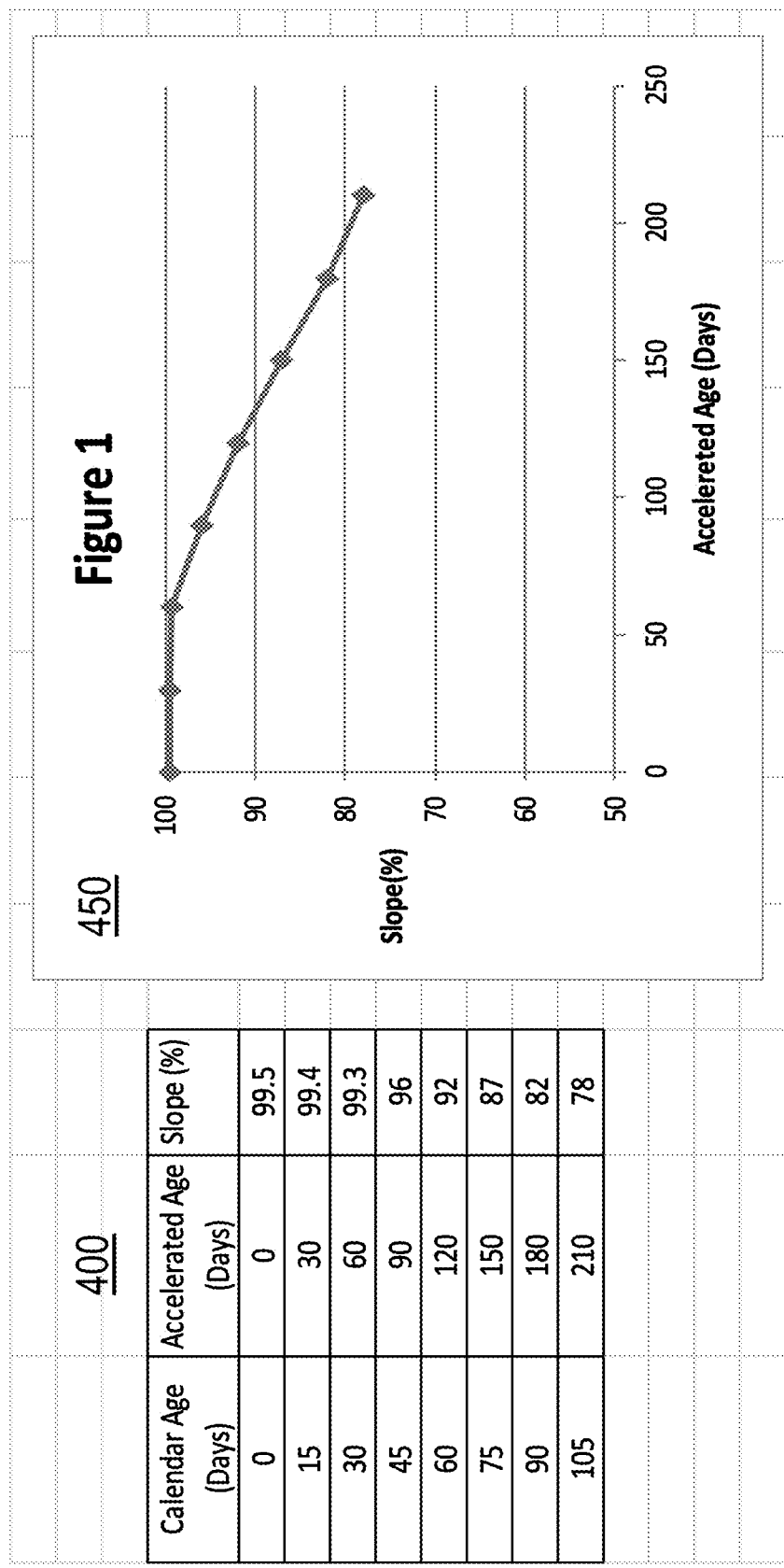
FIG. 4 illustrates an example Table of data, including information such as calendar age, accelerated age and electrode slope, which are determined and collected over time for a sensor, such as the pH sensor in the sensor system of FIGS. 1 and 2, and also illustrates an example of a graph showing the relationship between the electrode slope and accelerated age based on the information from the Table.

An example of a database of electrode slope and accelerated age values stored in a sensor history log can be thought of as a set of x-y pairs which can be depicted in tabular form in a Table 400 or graphically in a graph 450 as shown in FIG. 4.

Using the example in FIG. 4, an example implementation could be implemented as follows. A hypothetical user's policy is to replace pH sensors when their slope degrades to a value of 80% and the user enters this threshold value into the transmitter. For simplicity, the process solution being monitored by the pH sensor is assumed to have a constant temperature of 35° C. Thus, if k in equation (4) is 0.069, accelerated age will be twice the calendar age. The transmitter has a Slope Status parameter that can be output to the user by means of a display or other digital communications means (e.g., the output device 178 in FIG. 2). After each calibration, which in the example is carried out every 15 days, a transmitter algorithm examines the sensor history log data and outputs a Slope Status parameter. The Slope Status parameter outputs could be those in Table 500 of FIG. 5 based on this hypothetical example.

As described in the example of FIG. 5, the transmitter algorithm does not make a prediction if the electrode slope is greater than 90%. As time passes, the algorithm sees that the slope has degraded to 87%. Based on the previously determined Slope of 92%, the algorithm calculates that the slope is degrading at a rate of 5% per 30 "Accelerated Days" and predicts it will degrade the remaining 7% to the Threshold of 80% in 7/5×30=42 Accelerated Days. Using the measured temperature of 35° C., the algorithm inverts equation (4) and calculates that 21 Calendar Days remain at that temperature which is output as the Slope Status. Subsequently, with the slope now of 82%, the algorithm looks back at the previous Slope of 87% that was determined 30 Accelerated Days ago, and calculates that the remaining 2% degradation to 80% will occur in 2/5×30=12 Accelerated Days, which at 35° C. equals 6 Calendar Days.

An example embodiment of the service prediction feature has been described above. However, a number of obvious and not-so-obvious aspects of the service prediction feature can be pointed out. For example, having established in the sensor history log of the pH sensor a set of x-y pairs corresponding to an accelerated age and a slope percentage (%), any number of extrapolation algorithms for predicting a future slope value can be imagined. The linear extrapolation shown in the example above using only the most recent two slope values is about the simplest imaginable algorithm, but many useful alternatives using more than two x-y pairs and non-linear predictions could be proposed.

The service prediction example above is a simple model. The relationship between calendar age and accelerated age, however, can depend on the entire temperature profile experienced by the sensor. Furthermore, the algorithm parameters and the Slope Status Outputs in the example are quite arbitrary. A service prediction could be made when the electrode slope is, for example, greater than 90%. Because of the nature of pH sensors, it may however be desirable not to hazard a prediction until a clearly detectable degradation in slope has occurred.

In addition, the equation (4) is also among the simplest models of the degradation of a pH sensor's slope with temperature. More complicated models can be used to improve predictions according to the application. Degrading factors other than temperature can certainly be expected to be useful for such service predictions for pH and other types of sensors, for example, vibration and pressure sensors.

Electronic Message Link

The sensory history log can be a valuable source of information for both the user and designer of a smart sensor. One of the challenges to the end user of a sensor product is to select the right product for their application and to maintain the product properly with a minimum cost of ownership. One of the challenges to the designer of a product is to understand the end users' needs and requirements and problems and to design features into the product that address them. In this example embodiment, an electronic message link feature is provided, which enhances the usefulness of a sensor history log to both the user and designer by facilitating transmission of a sensor history log from a sensor that has been installed in a process to the sensor manufacturer and designers.

As previously discussed, a smart pH sensor (e.g., pH sensor 110 in FIGS. 1-3) can be calibrated in a lab or instrument shop and then installed in a process where its calibration coefficients will be read by or uploaded into the read-out device or other host computer system. Calibration in the lab or instrument shop can be carried out using a second read-out device just like the one used at the measurement location. However, since the pH sensor has digital communications capability, with the proper interface or modem the pH sensor can alternatively communicate directly with a desktop or laptop computer (e.g., computer 300 in FIG. 3). Thus, if a computer has a software application loaded which can solve the calibration equations above (e.g., equations (1) and (2)), the pH sensor can be calibrated while connected to a computer in the lab or shop rather than to a specialized read-out device that is used at the process measurement site. Computer user interfaces are generally far easier to use than those on dedicated read-out devices which typically have simple output devices such as displays and input devices such as keypads at best.

In this example embodiment, a feature is provided, such as via a pH sensor software application operating on a host computer system, that provides a graphical user interface (GUI) which incorporates a link, e.g., a hyperlink, to facilitate transmission of sensor history log data to a remote party. For example, when the link is clicked or selected, an electronic message (e.g., email or the like) is generated and opened on the user's computer with the sensor history log as a file attachment and an email address within, for example, the manufacturer's or designer's organization. The link can be integrated as part of a device-type manager (DTM) such as for the pH sensor 110. A screenshot of an example graphical user interface (GUI) of a DTM 600 is shown in FIG. 6.

Figure 6:
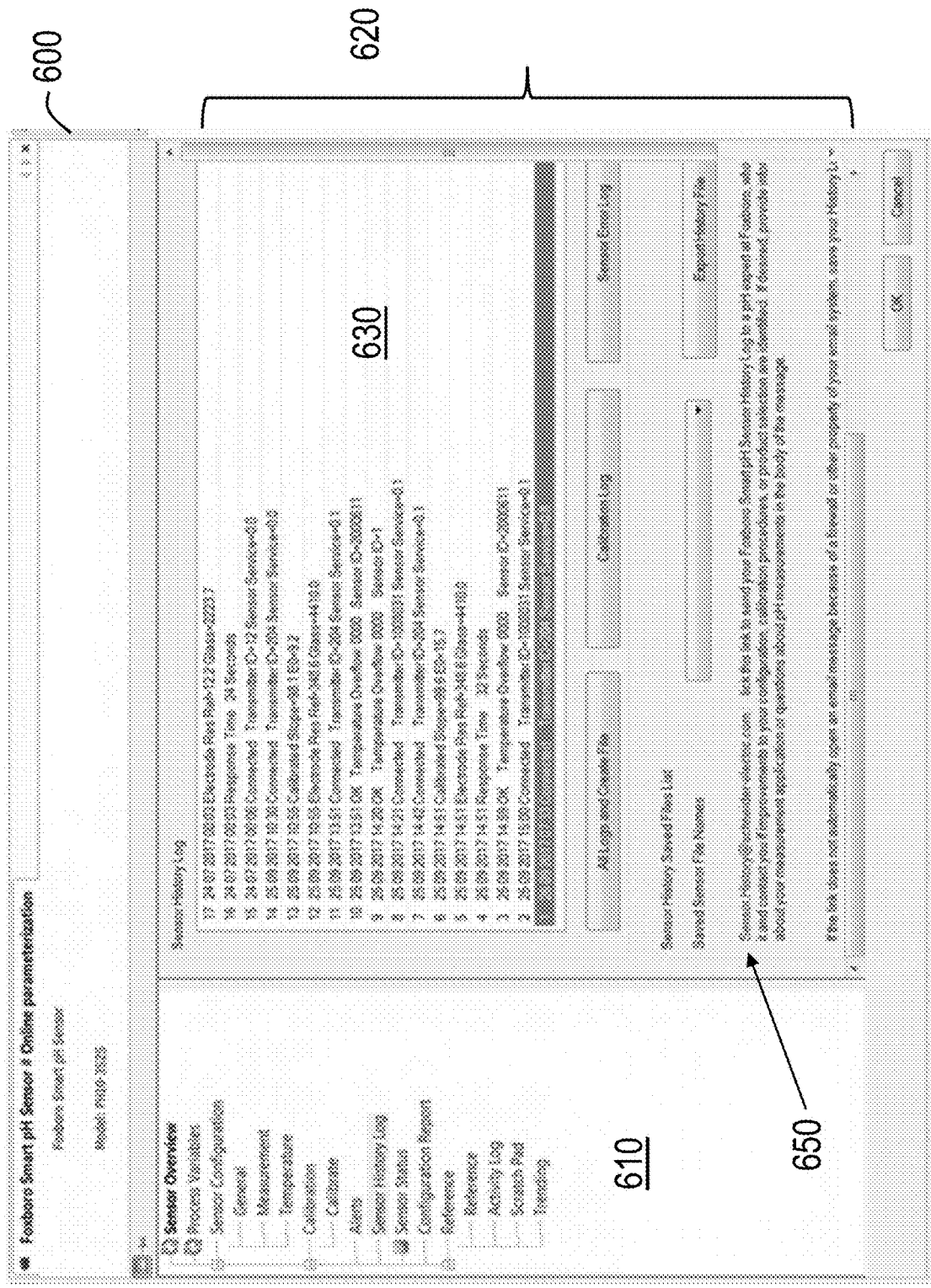
FIG. 6 illustrates an example graphical user interface (GUI) of a device type manage (DTM) for a sensor, such as the pH sensor, in which the GUI of the DTM incorporates a link to generate and send a sensor history log to a remote party, in accordance with a further embodiment.

In FIG. 6, the GUI of the DTM 600 includes various sections such as a tree-view section 610 to traverse the various functions and information provided through the DTM, e.g., Sensor Overview, Process Variables, Sensor Configuration (General, Measurement, and Temperature), Calibration (Calibrate), Alert, Sensor History Log, Sensor Status, Configuration Report, Reference (Reference, Activity Log, Scratch Pad, Trending). In this example, the Sensor History Log function has been selected so that the DTM 600 provides a section 620 to access and perform operations as to various logs using graphical inputs (e.g., All Logs and Create File, Calibration Log, Sensor Error Log, and Export History File including a pull down box to select the file). The section 620 of the DTM 600 can also include a window 630 for displaying the entries of a log, such as the sensor history log of a pH sensor, and a hyperlink 650, e.g., Sensor.History@schneider-electric.com. In this example, the hyperlink 650 is a 1-click link to trigger an email to the supplier or other recipient. The email includes a copy of the sensor history log of the connected sensor as a file attachment. The generated email can be sent automatically thereafter or upon further input or action by the user.

The incorporated link in the DTM provides among other things the following benefits and advantages. For example, by allowing "1-click" transmission of sensor data from a customer site to a supplier's business unit, the effort required by the customer is reduced to the barest minimum. Subject Matter Expert (SME) in a business unit that supplies a sensor can review sensor history and advise an end user regarding optimal configuration, calibration, and application of the sensor. Customer intimacy also is fostered by directly connecting a business with end users of its products. It also facilitates troubleshooting by technical service personnel of issues at an end user's site. Furthermore, the business unit that designs, manufactures, and markets the sensor can accumulate data on how the product is applied by an end user and thereby develop a knowledge base that helps optimize future products or features tailored to end user needs and habits.

There is growing demand for predictive maintenance features in products, but development of these features requires data on the behavior of these products in the field. Often with complex distribution and supply chains, developers find themselves far removed from the users of products they develop. This impedes innovation of features that meet end user's needs. Facilitating transmission of product history data to developers mitigates this difficulty.

FIG. 7 illustrates an example sensor history log 700, which can be stored in a memory of the transmitter, computer, pH sensor and/or other component of the sensor system of FIGS. 1 and 2. Reading from top to bottom, a chronicle of history log entries can, for example, start when the pH sensor 110 is first connected to a host computer system (e.g., a computer 300) with device-type manager (DTM) software, such as in FIG. 3, and calibrated at the factory. In this example, log entries 1 through 3 occurred while at the factory. The remaining entries occurred at the user's site, either while connected to a computer 300 with DTM in a lab (as in FIG. 3) or connected to a transmitter 150 at the measurement location (as in FIGS. 1 and 2) or connected to some host computer system. The sensor history log 700 in the example of FIG. 7 illustrates several points described above: a record of calibration dates with sensor properties, e.g., values of electrode slope S and asymmetry potential $E_0$, is captured; a demonstration of the runtime odometers, e.g., calendar age odometer and accelerated age odometer, accumulating the time that the sensor is presumed to be in use is provided; and a sensor response time feature is demonstrated. A response time value is recorded after switching from the first to the second calibration buffer. Increasing response time is a sign of sensor wear.

As shown in the sensor history log 700, when the slope of the pH sensor 110 falls below 90%, a value that can be set by the user, the data in the sensor history log is used to predict when the slope will fall to a value of 80%, another value (e.g., a threshold value) that can be set by the user. In this case, it is observed that the slope has fallen from 93% (Entry 13) to 88% (Entry 17) over a runtime of about 30 days. A linear extrapolation predicts that the slope will fall to about 80% when another 47 days of runtime has elapsed. This is a very simple illustration, extrapolating based only on the most recent prior slope value, and with no accounting for how temperature, which is left out of this example for simplicity, might affect behavior. However, the sensor history log 700 can also include accelerated age odometer data which would account for temperature or other measurable environmental conditions that further degrades or affects the electrode slope or other sensor property.

The value of the information in the sensor history log (to both the user and the supplier of the sensor) is described above in general terms. Specifically, the following useful information is shown in this example: the user calibrates once per month; the user uses a computer with DTM for calibration; the user's application causes degradation of both response time and slope over a runtime of about 90 days; and performance degradation can be remedied to a significant extent by cleaning the pH sensor.

Examples of the methods of implementing the various functions and features, as described herein, will be discussed below with reference to FIGS. 8-11. For the purposes of explanation, the various example methods will be described with reference to a processor(s) and other components of a host computer system, such as the transmitter 150 of the sensor system 100 in FIGS. 1 and 2 or the computer 300 in FIG. 3.

Figure 8:
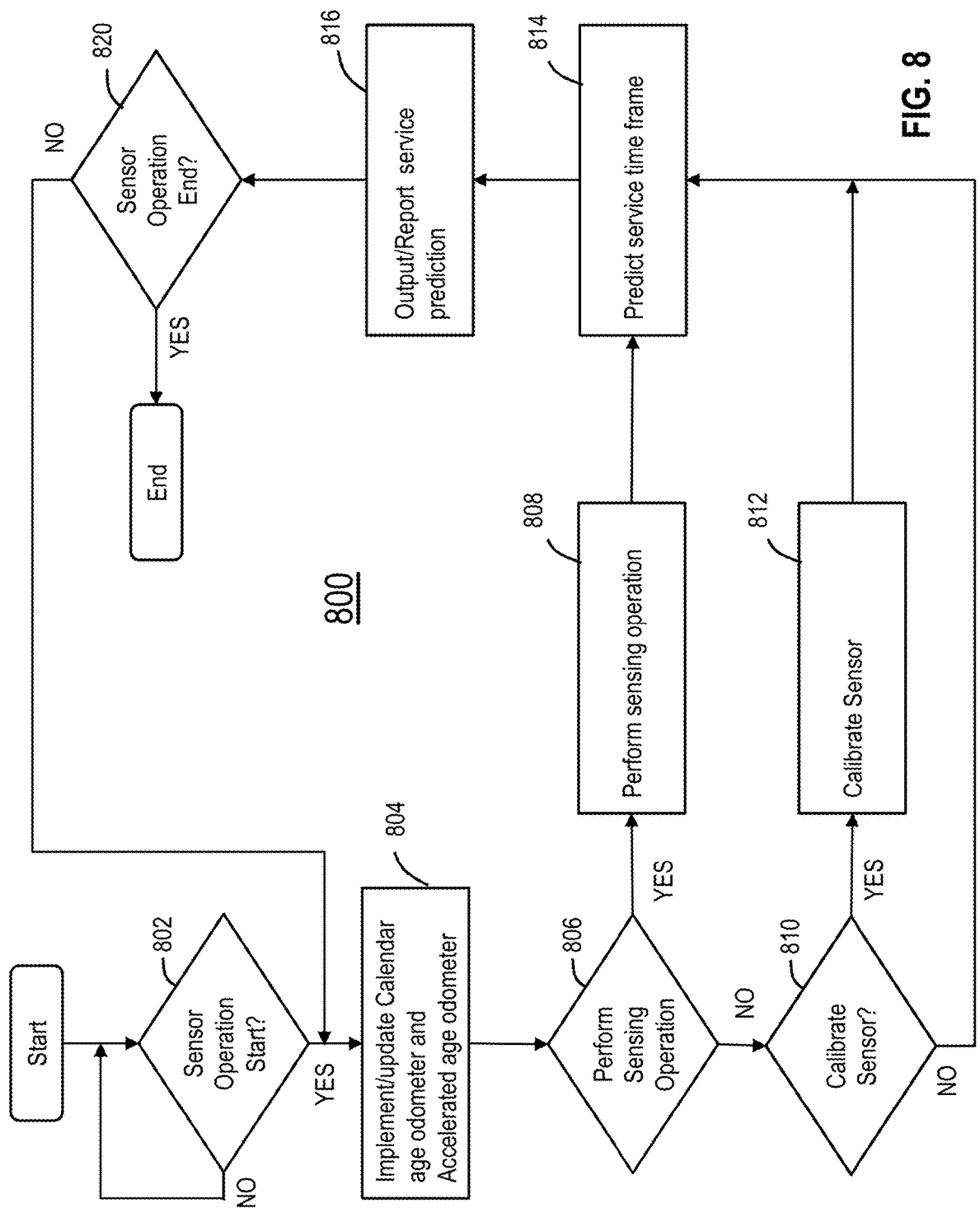
FIG. 8 illustrates a flow diagram of an example overall process implemented by a host computer system, such as a transmitter of FIGS. 1 and 2 or a computer of FIG. 3, in accordance with an embodiment.

FIG. 8 illustrates a flow diagram of an example overall process 800 implemented by a processor(s) of a host computer system, such as a transmitter of FIGS. 1 and 2 or a computer of FIG. 3.

At reference 802, the processor determines whether operation of the pH sensor 110 has started, e.g., the pH sensor is in use. For example, sensor operation begins when the pH sensor 110 is connected to the host computer system, or is turned or powered ON. If sensor operation has started, the processor implements or updates the calendar age odometer and an accelerated age odometer at reference 804.

At reference 806, the processor determines whether sensing operations are to be performed using the pH sensor 110. If so, the processor controls the operations of the host computer and the pH sensor 110 to perform pH measurement of a solution. The process 800 then proceeds to reference 814.

If sensing operations are not to be performed, the processor determines whether the pH sensor 110 is to be calibrated at reference 810. If so, the processor controls the operations of the host computer and the pH sensor 110 to perform calibration operations. For example, the calibration operations may include a determination of the parameters of sensor properties which change over time with the usage of the pH sensor. The parameters can include, for example, the values of the electrode slope S and asymmetry potential $E_0$. The parameters are then stored or updated on the pH sensor 110 for subsequent use thereof when taking pH measurements. The process 800 then proceeds to reference 814. If calibration is not being performed, the processor proceeds to reference 814.

At reference 814, the processor can predict a service time frame according to operational data for the pH sensor 110, which is collected and stored on the host computer and/or the pH sensor such as in a sensor history log or other location. As discussed herein, the service prediction time frame can be based on the tracked accelerated age in relations to the sensor property, e.g., the electrode slope, or vice-a-versa, and a slope threshold (e.g., 80% of an ideal electrode slope for the pH sensor). In one example, the service prediction can be implemented only after the electrode slope has degraded past an initial threshold (e.g., 90%). The initial threshold can be determined or defined relative to a final threshold of the electrode slope at which service would be required.

At reference 816, the processor can output and report the service prediction locally or remotely. For example, the service prediction can be output or reported locally through an output device (e.g., display) of the host computer system. The service prediction can also be output or reported to a remote location, e.g., a regional or central management system, through a communication device of the host computer system. The service prediction can be outputted or reported upon a user command (e.g., inputted from a user device) or when a condition is met (e.g., a time condition/threshold such as 5-days or less before service is needed according to the prediction).

At reference 820, the processor determines whether the sensor operation has ended. For example, sensor operation has ended if the pH sensor 110 is disconnected from the host computer system, or is turned or powered OFF. If sensor operation has ended, the process 800 is terminated. Otherwise, the process 800 returns back to reference 804.

Figure 9:
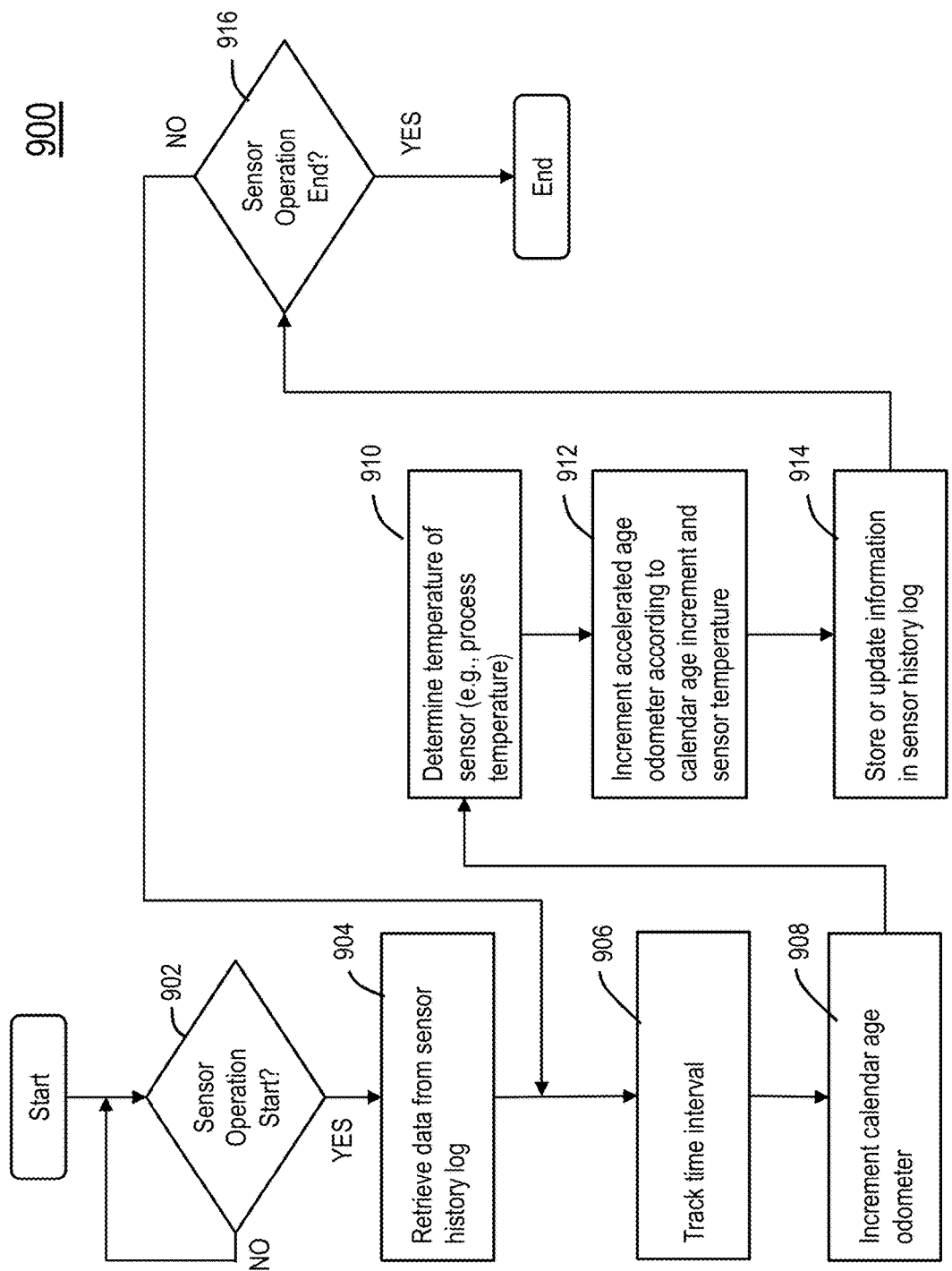
FIG. 9 illustrates a flow diagram of an example odometer process implemented by a host computer system, such as a transmitter of FIGS. 1 and 2 or a computer of FIG. 3, to track a calendar age and accelerated age of a pH sensor in accordance with an embodiment.

FIG. 9 illustrates a flow diagram of an example odometer process 900 implemented by a processor(s) of a host computer system, such as a transmitter of FIGS. 1 and 2 or a computer of FIG. 3, to track a calendar age and accelerated age of a pH sensor.

At reference 902, the processor determines whether operation of the pH sensor 110 has started. For example, sensor operation starts when the pH sensor 110 is connected to the host computer system, or is turned or powered ON. If sensor operation has started, the processor retrieves data from the sensor history log, including for example the last values stored for the calendar age and the accelerated age at reference 904.

At reference 906, the processor tracks a time interval that has passed while the sensor is in operation. The time interval can be tracked using a clock or other timer available to the host computer. At reference 908, the processor updates the calendar age odometer with the tracked time interval (e.g., a predefined or variable time interval). For example, the processor increments the prior calendar age with the tracked time interval (e.g., calendar $age_{present}$=calendar $age_{prior}$+calendar $age_{increment}$ where the calender $age_{prior}$ is the prior accumulated calendar age and the calendar $age_{increment}$ is the recent tracked time interval of sensor operation (also referred to as calendar age increment)).

At reference 910, the processor determines a temperature of the pH sensor 110 (e.g., process temperature), for example, based on measurements taken from the temperature sensor 116 of the pH sensor. The processor can also obtain measurements of other measurable environmental conditions which may impact the sensor property.

At reference 912, the processor increments the accelerated age odometer according to the calendar age increment, and the associated temperature of the pH sensor 110 or other associated measurable environmental condition. For example, as previously explained, the processor can calculate an accelerated $age_{increment}$ (or accelerated age increment) with the equation (4) above based on the calendar age increment and the associated temperature of the pH sensor 110. The processor can then increment the prior accelerated age with the calculated accelerated age increment to determine a present accelerated age (e.g., accelerated $age_{present}$=accelerated $age_{prior}$+accelerated $age_{increment}$).

At reference 914, the processor can then store or update the calendar age, accelerated age and other related information in the sensor history log or other location in the memory 114 of the host computer system and the pH sensor 110. As explained herein, the accelerated age can then be used with other determined and collected information, such as the electrode slope, to predict a time frame when service may be required.

At reference 916, the processor determines whether the sensor operation has ended. For example, sensor operation has ended if the pH sensor 110 is disconnected from the host computer system, or is turned or powered OFF. If sensor operation has ended, the process 900 is terminated. Otherwise, the process 900 returns back to reference 906 to perform the operations to update the calendar age odometer and the accelerated age odometer for the pH sensor 110.

Figure 10:
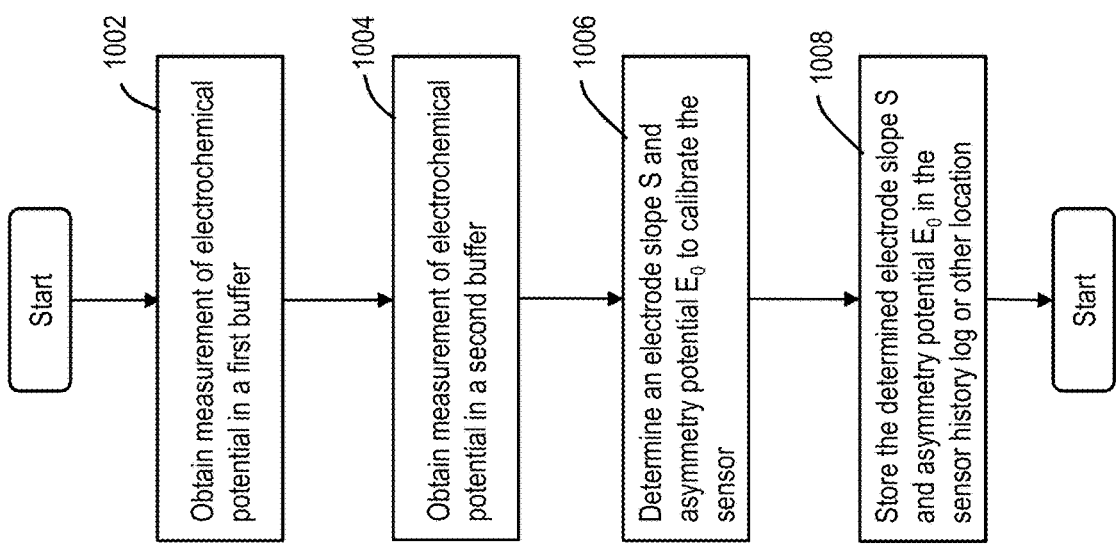
FIG. 10 illustrates a flow diagram of an example calibration process implemented by a host computer system, such as a transmitter of FIGS. 1 and 2 or a computer of FIG. 3, to calibrate a pH sensor in accordance with an embodiment.

FIG. 10 illustrates a flow diagram of an example calibration process 1000 implemented by a host computer system, such as a transmitter of FIGS. 1 and 2 or a computer of FIG. 3, to calibrate a pH sensor with an embodiment.

At reference 1002, the processor obtains measurement of an electrochemical potential in a first buffer from the pH sensor 110.

At reference 1004, the processor obtains measurement of an electrochemical potential in a second buffer from the pH sensor 110.

At reference 1006, the processor determines sensor parameters, e.g., an electrode slope S and an asymmetry potential $E_0$, to calibrate the pH sensor 110.

At reference 1008, the processor stores or updates the determined sensor parameters in the memory 114 of the pH sensor 110, such as in the sensor history log or other data repository.

Figure 11:
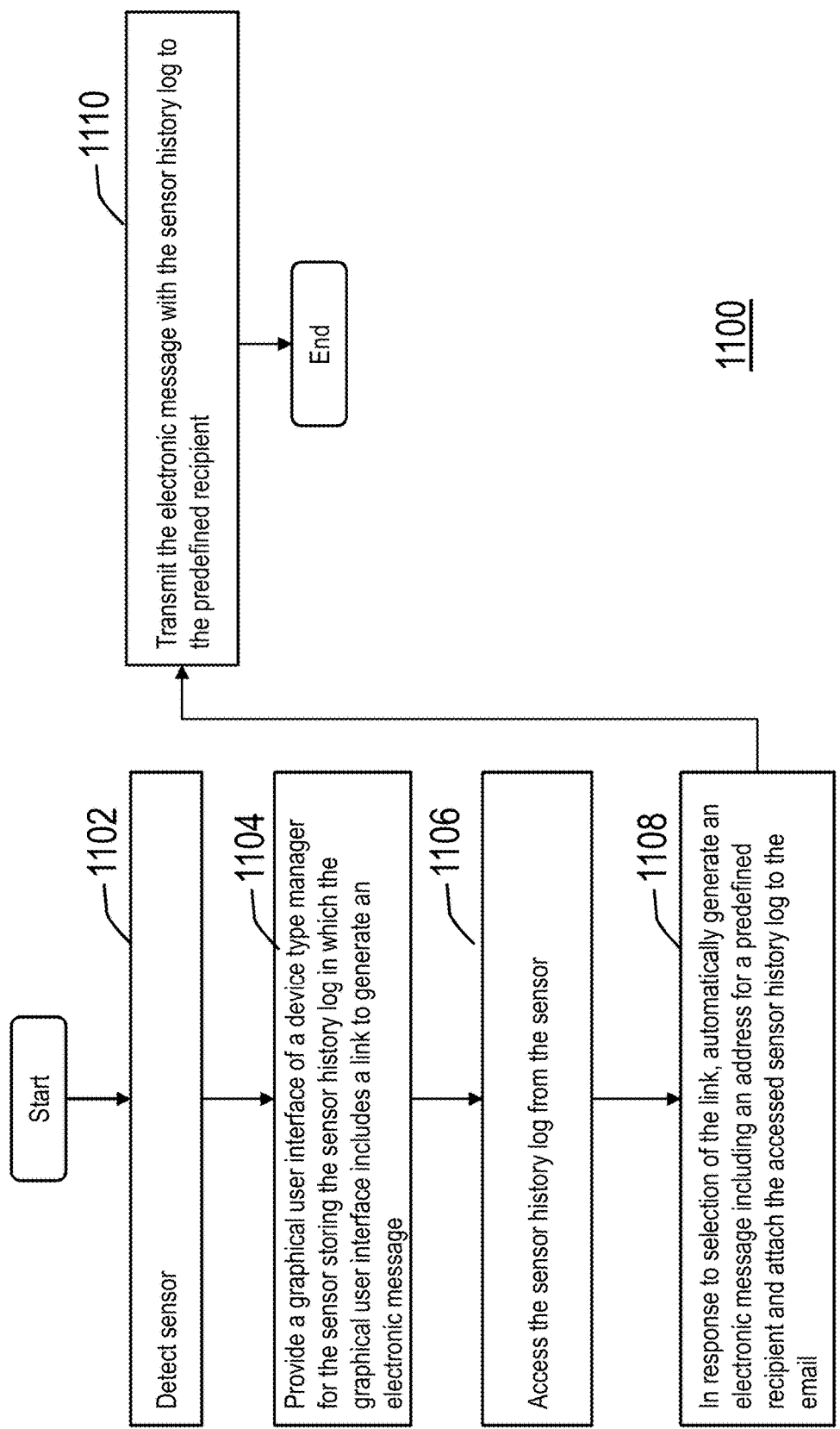
FIG. 11 illustrates a flow diagram of an example DTM process implemented by a host computer system, such as a transmitter of FIGS. 1 and 2 or a computer of FIG. 3, to provide a link on the GUI of a DTM from which to automatically generate and send a sensor history log to a remote party in accordance with an embodiment.

FIG. 11 illustrates a flow diagram of an example device type manage (DTM) process 1100 implemented by a host computer system, such as a transmitter of FIGS. 1 and 2 or a computer of FIG. 3, to provide a link on the GUI of a DTM from which to automatically generate and send a sensor history log to a remote party.

At reference 1102, the processor detects the pH sensor, e.g., detects that the pH sensor 110 has been connected to the host computer or is available to communicate with the processor of the host computer system.

At reference 1104, the processor provides a graphical user interface (GUI) of a device type manage (DTM) for the pH sensor 110, which stores a sensor history log. The GUI of the DTM includes a link to generate an electronic message (e.g., email or the like). The email can include a predefined recipient address(es).

At reference 1106, the processor accesses the sensor history log from the sensor, which may be displayed in a window of the GUI.

At reference 1108, the processor, in response to selection of the link, automatically generates an electronic message including an address for a predefined recipient and attaches the sensor history log (accessed from the pH sensor) to the electronic message.

At reference 1110, the processor transmits the electronic message, along with the sensor history log, to the predefined recipient(s) using the communication device.

Various example methods have been described above with reference to FIGS. 8-11. It should be understood that the operations performed in these example method can be varied or modified (e.g., varying the order of the operations, combining operations, eliminating some operations, etc.) to provide the sensing, calibrating, service predicting and electronic message generating and other functions and features described herein.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, thresholds, masks and other elements used herein are provided as examples, and can be given a different name or label.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/ or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

A processor(s) or controller(s) as described herein can be a processing system, which can include one or more processors, such as CPU, GPU, controller, FPGA (Field Programmable Gate Array), ASIC (Application-Specific Integrated Circuit) or other dedicated circuitry or other processing unit, which controls the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

Furthermore, the odometer, service prediction and electronic message features and functions can be implemented on a host computer system which interacts with a sensor, such as a pH sensor or other smart sensor which may face accelerated aging resulting from measurable environmental conditions. It should be understood that the functionality of the host computer system, as described herein, can also be incorporated into the pH sensor.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A computer-implemented method of predicting sensor service for a sensor, the method comprising:
monitoring sensor operations of the sensor;
implementing a first age meter which increments a first age of the sensor by a first time interval as the sensor operates, the first age representing a duration of time that the sensor has operated;
obtaining a sensor temperature or other measurable environmental condition for each increment of the first age;
implementing a second age meter which increments a second age of the sensor by a second time interval according to the increment of the first age and the sensor temperature or other measurable environmental condition associated therewith, the second age representing an operational age of the sensor which accounts for degradation of the sensor as a result of sensor temperature or other measurable environmental condition during sensor operation;
obtaining a value of a sensor property, which degrades with usage of the sensor over time, at different first ages or second ages of the sensor over time; and
predicting when the sensor property of the sensor is anticipated to reach a sensor property threshold based on values of the sensor property in relation to the second age; and
outputting a status of the sensor property based on the prediction, wherein, the second age differs from the first age with usage of the sensor over time.

2. The computer-implemented method of claim 1, further comprising:
storing or updating sensor information over time in a sensor history log on a memory in the sensor, the sensor history log including the first age, the second age and the sensor property.

3. The computer-implemented method of claim 1, wherein the sensor is a pH sensor and the sensor property is an electrode slope reflecting a relationship between electrochemical potential and pH for the pH sensor.

4. The computer-implemented method of claim 3, wherein each increment of the second age is determined according to the following relationship:

$$A_{Acc} = A_{25} \cdot e^{k \cdot (T-25)}$$

where:
$A_{Acc}$ is an increment of the second age,
$A_{25}$ is an increment of the first age,
e is a base of the natural logarithm,
k is an experimentally determined constant, and
T is the temperature in ° C. of the sensor for the increment of the first age.

5. The computer-implemented method of claim 1, wherein the prediction of when the sensor property of the sensor is anticipated to reach a sensor property threshold is implemented using a linear extrapolation of the sensor property in relation to the second age.

6. The computer-implemented method of claim 1, wherein the first age is incremented by the first age meter by adding the first time interval to a prior accumulation of increments of the first age, and the second age is incremented by the second age meter by adding the second time interval to a prior accumulation of increments of the second age.

7. The computer-implemented method of claim 1, wherein the status of the sensor property is outputted to a remote management system.

8. The computer-implemented method of claim 1, further comprising:
providing a graphical user interface of a device type manager for the sensor, the sensor storing a sensor history log, the graphical user interface including an email link;
accessing the sensor history log from the sensor;
in response to selection of the email link, automatically generating an email including an address for a predefined recipient and attaching the accessed sensor history log to the email; and
transmitting the generated email to the predefined recipient.

9. The computer-implemented method of claim 1, wherein sensor service is to be performed when the sensor property reaches or exceeds the sensor property threshold.

10. A sensor service prediction system for a sensor, the system comprising:
a memory; and
one or more processors configured to:
monitor sensor operations of the sensor;
provide a calendar age odometer which increments a calendar age of the sensor by a first time interval as the sensor operates, the calendar age representing a duration of time that the sensor has operated;
determine a sensor temperature or other measurable environmental condition for each increment of the calendar age;
provide an accelerated age odometer which increments an accelerated age of the sensor by a second time interval according to the increment of the calendar age and the sensor temperature or other measurable environmental condition associated therewith;
obtain a value of a sensor property, which degrades with usage of the sensor over time, at different calendar ages or accelerated ages of the sensor over time; and
predict when the sensor property of the sensor is anticipated to reach a sensor property threshold based on values of the sensor property in relation to the accelerated age; and
output a status of the sensor property based on the prediction,
wherein, the second age differs from the first age with usage of the sensor over time.

11. The system of claim 10, wherein the processor is further configured to store or update sensor information over time in a sensor history log on a memory in the sensor, the sensor history log including the first age, the second age and the sensor property.

12. The system of claim 10, wherein the sensor is a pH sensor and the sensor property is an electrode slope reflecting a relationship between electrochemical potential and pH for the pH sensor.

13. The system of claim 12, wherein each increment of the second age is determined according to the following relationship:

$$A_{Acc} = A_{25} \cdot e^{k \cdot (T-25)}$$

where:
$A_{Acc}$ is an increment of the second age,
$A_{25}$ is an increment of the first age,
e is a base of the natural logarithm,
k is an experimentally determined constant, and
T is the temperature in ° C. of the sensor for the increment of the first age.

14. The system of claim 10, wherein the prediction of when the sensor property of the sensor is anticipated to reach a sensor property threshold is implemented using a linear extrapolation of the sensor property in relation to the second age.

15. The system of claim 10, wherein the first age is incremented by the first age meter by adding the first time interval to a prior accumulation of increments of the first age, and the second age is incremented by the second age meter by adding the second time interval to a prior accumulation of increments of the second age.

16. The system of claim 10, wherein the status of the sensor property is outputted to a remote management system.

17. The system of claim 10, wherein the processor is further configured:
to provide a graphical user interface of a device type manager for the sensor, the sensor storing a sensor history log, the graphical user interface including an email link;
to access the sensor history log from the sensor;
in response to selection of the email link, to automatically generate an email including an address for a predefined recipient and to attach the accessed sensor history log to the email; and
to transmit the generated email to the predefined recipient via a communication device.

18. The system of claim 10, wherein sensor service is to be performed when the sensor property reaches or exceeds the sensor property threshold.

19. The system of claim 10, wherein the one or more processors includes a processor of the sensor and a processor of a host computer system, the sensor and the host computer configured to be connected across a cable through which communication is conducted therebetween.

20. A tangible computer medium storing computer executable code, which when executed, is configured to implement a method of predicting sensor service for a sensor, the method comprising:

monitoring sensor operations of the sensor;

implementing a first age meter which increments a first age of the sensor by a first time interval as the sensor operates, the first age representing a duration of time that the sensor has operated;

obtaining a sensor temperature or other measurable environmental condition for each increment of the first age;

implementing a second age meter which increments a second age of the sensor by a second time interval according to the increment of the first age and the sensor temperature or other measurable environmental condition associated therewith;

obtaining a value of a sensor property, which degrades with usage of the sensor over time, at different first ages or second ages of the sensor over time;

predicting when the sensor property of the sensor is anticipated to reach a sensor property threshold based on values of the sensor property in relation to the second age; and outputting a status of the sensor property based on the prediction, wherein, the second age differs from the first age with usage of the sensor over time.

* * * * *